(12) United States Patent
Inoue et al.

(10) Patent No.: US 6,550,564 B2
(45) Date of Patent: Apr. 22, 2003

(54) SADDLE-TYPE VEHICLE WITH AUTOMATIC TRANSMISSION

(75) Inventors: Masahiro Inoue, Saitama (JP); Hitoshi Furuhashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 92 days.

(21) Appl. No.: 09/821,036

(22) Filed: Mar. 30, 2001

(65) Prior Publication Data

US 2001/0040066 A1 Nov. 15, 2001

(30) Foreign Application Priority Data

Mar. 30, 2000 (JP) .......................... 2000-095162

(51) Int. Cl.$^7$ .................. B60K 15/073; B60K 20/00
(52) U.S. Cl. .................... 180/336; 180/908; 74/473.23; 280/833; 280/835
(58) Field of Search ................. 180/336, 908; 280/833, 834, 835; 74/473.1, 473.23, 502.2

(56) References Cited

U.S. PATENT DOCUMENTS 4,545,589 A * 10/1985 Watanabe et al. ........... 180/336
4,938,092 A * 7/1990 Nebu et al. ................. 180/219
6,186,263 B1 * 2/2001 Takano ....................... 180/336
6,213,514 B1 * 4/2001 Natsume et al. ............. 280/833

FOREIGN PATENT DOCUMENTS

JP  401223089 A * 9/1989
JP  411198882 A * 7/1999

* cited by examiner

*Primary Examiner*—Paul N. Dickson
*Assistant Examiner*—Ruth Ilan
(74) *Attorney, Agent, or Firm*—Birch, Stewart, Kolasch & Birch, LLP

(57) ABSTRACT

A vehicle having a fuel tank mounted about the central upper part of the vehicle is disclosed. A tank cover covers the fuel tank, and a gearshift lever for an automatic transmission is located on a side of the fuel tank. A recess is formed in the side of the fuel tank, by cutting an opening toward the inside of the vehicle. The gearshift lever is disposed in a space formed between the recess and the tank cover. This arrangement provides a saddle-type vehicle with a larger, more comfortable leg space for the driver and permits the mounting of an automatic transmission with a gearshift lever located as close to the driver as possible.

21 Claims, 4 Drawing Sheets

SADDLE-TYPE VEHICLE WITH AUTOMATIC TRANSMISSION

BACKGROUND OF THE INVENTION

1. Field of the Invention

The present invention relates to a three- or four-wheeled saddle-type vehicle and, more particularly, to a saddle-type vehicle mounted with an automatic transmission.

2. Background Art

A conventional saddle-type vehicle structure 1 is shown in FIGS. 4 and 5. A conventional vehicle 1 is comprised of a vehicle frame 2, front wheels 3 mounted on both sides of the front part of the vehicle frame 2, rear wheels 4 mounted on both sides of the rear part of the vehicle frame 2, a steering handlebar 5 for steering the front wheels 3, a fuel tank 6 mounted behind the steering handlebar 5, a seat 7 mounted behind the fuel tank 6, a front fender 8 mounted to cover the upper part of the front wheels 3, and a rear fender 9 mounted to cover the upper part the rear wheel 4.

Braking levers 10 and 11 are installed at both ends of the steering handlebar 5 for brake application to the vehicle 1 as shown in FIG. 5. An engine 12 equipped with an automatic transmission is mounted below the fuel tank 6 and the seat 7. Furthermore, a gearshift lever 13, which is connected to the automatic transmission, is installed on a side of the fuel tank 6.

The above-described conventional vehicle 1 structure has been found by the present inventors to suffer from the following problems. The installation of the gearshift lever 13 on the side of the fuel tank 6 presents space/accomodation difficulties. For instance, the space around the driver's leg is substantially decreased, and, depending on the position of the fuel tank 6, the gearshift lever 13 will be undesirably far from the driver's reach.

SUMMARY OF THE INVENTION

The present invention overcomes the shortcomings associated with the related art and achieves other advantages not realized by the related art.

An object of the present invention is to provide a saddle-type vehicle mounted with an automatic transmission that provides a wide, comfortable space around an operator's legs.

A further object of the present invention is to provide a saddle-type vehicle that enables convenient, accessible mounting of a gearshift lever closer to the vehicle operator than heretofore possible.

These and other objects are accomplished by a saddle-type vehicle with an automatic transmission, the vehicle comprising a fuel tank mounted at a central upper part of the vehicle; a tank cover provided to cover said fuel tank; a gearshift lever for said automatic transmission; and a recess formed in a left or right side of said fuel tank, wherein said gearshift lever is mounted in a space formed by said recess and said tank cover.

These and other objects are accomplished by a saddle-type vehicle comprising a vehicle body having a longitudinal centerline, wherein said vehicle body has a front portion, a central portion, and a rear portion with respect to said longitudinal centerline, and an upper portion located in a portion above said longitudinal centerline and a lower portion located below said longitudinal centerline; a fuel tank mounted adjacent to a steering handlebar in said central and said upper portion of said vehicle body; a tank cover provided to cover said fuel tank; a gearshift lever for a transmission; and a recess formed in a left side or a right side of said fuel tank, wherein said gearshift lever is mounted in a space formed by said recess and said tank cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not intended to limit the present invention to the embodiments shown, and wherein.

DETAILED DESCRIPTION OF THE PREFERRED EMBODIMENTS

Figure 1:
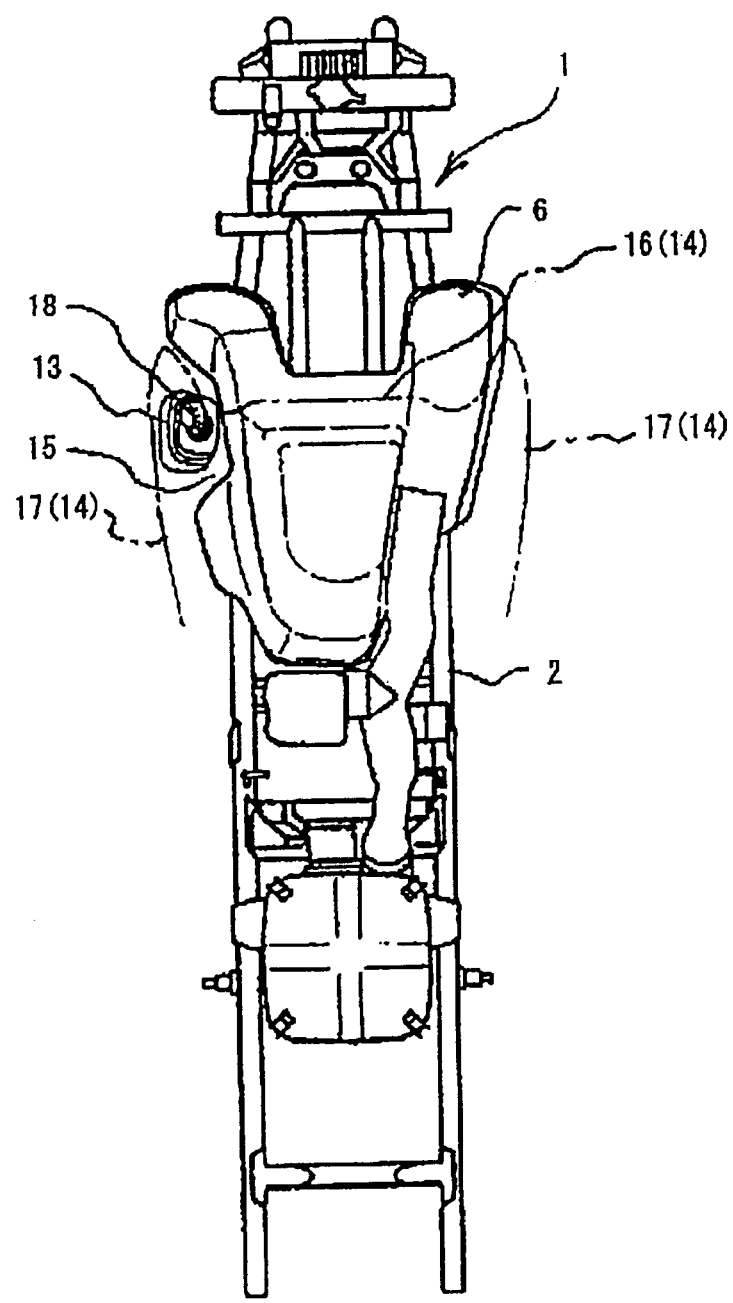
FIG. 1 is a plan view of the framework of a four-wheeled saddle-type vehicle according to an embodiment of the present invention.
Figure 2:
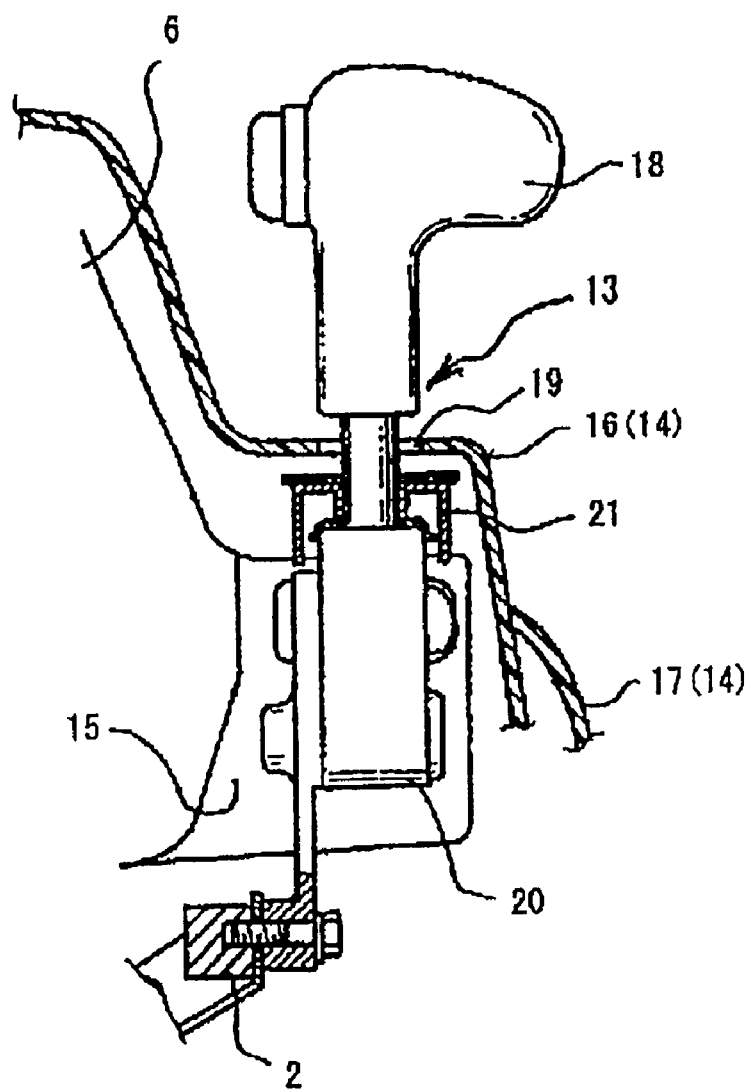
FIG. 2 is a longitudinal sectional view of a portion of a saddle-type vehicle according to an embodiment of the present invention.
Figure 3:
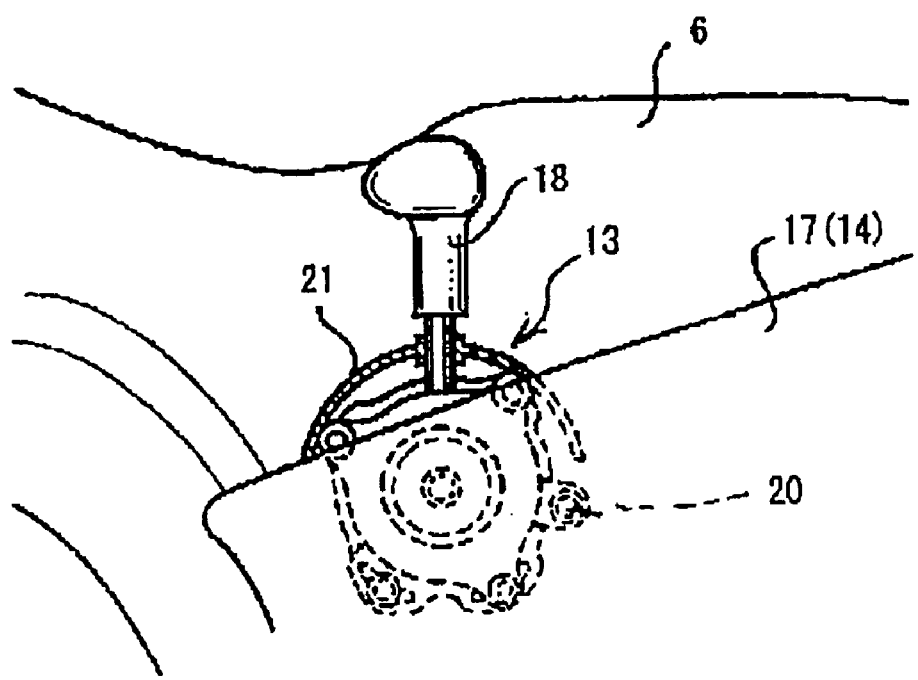
FIG. 3 is a side view of a portion of a saddle-type vehicle according to an embodiment of the present invention.
Figure 4:
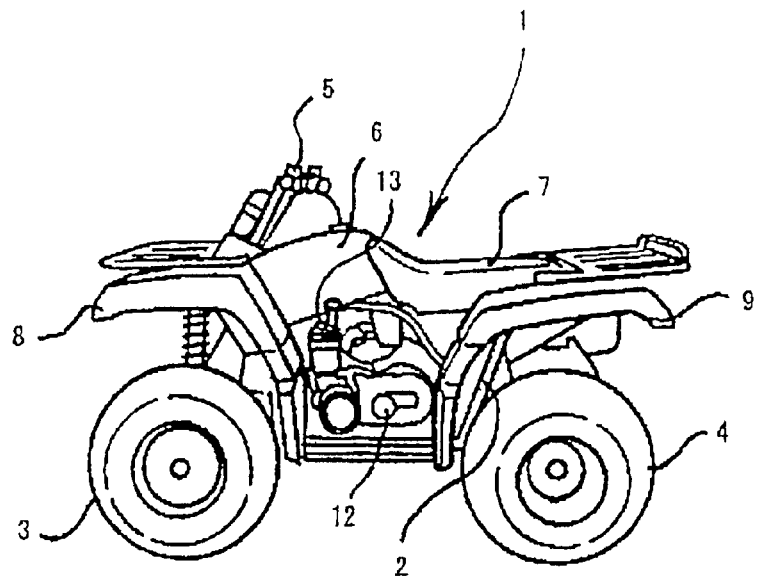
FIG. 4 is a side view of a conventional saddle-type vehicle.
Figure 5:
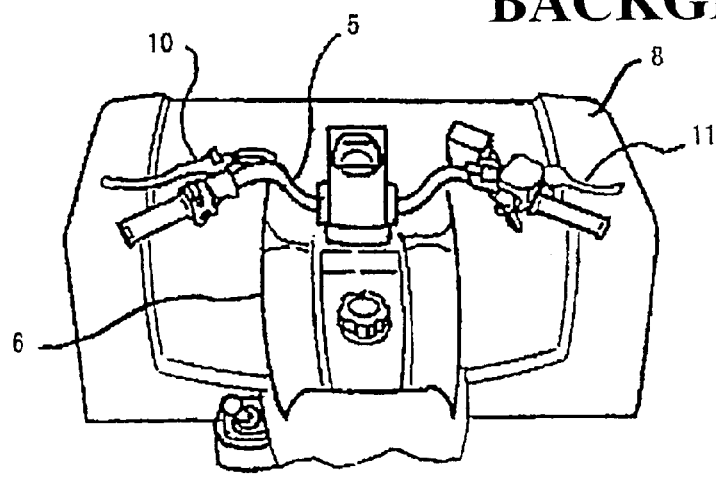
FIG. 5 is a plan view of a front part of the saddle-type vehicle shown in FIG. 4.

Hereinafter, the present invention will be described in detail with reference to the accompanying drawings. FIG. 1 is a plan view of the framework of a four-wheeled saddle-type vehicle according to an embodiment of the present invention. FIG. 2 is a longitudinal sectional view of a portion of a saddle-type vehicle according to an embodiment of the present invention. FIG. 3 is a side view of a portion of a saddle-type vehicle according to an embodiment of the present invention;

A saddle-type vehicle according to the present invention will be described with reference to FIG. 1 to FIG. 3. In the following description, common reference numerals for component members of the vehicle 1 shown in FIG. 1 to FIG. 3 are utilized and repeated when referring to structure similar to that found in the conventional vehicle of FIGS. 4 and 5.

As shown in FIG. 1, a tank cover 14 is provided to cover a fuel tank 6, and a gearshift lever 13 is located in a space between the left side of the fuel tank 6 and the tank cover 14.

In a preferred embodiment, a recess 15 is formed or cut toward the inside of the vehicle body on the left side of the fuel tank 6. The gearshift lever 13 is located in the space formed between the recess 15 and the tank cover 14.

As shown in FIG. 2, the tank cover 14, includes a top cover 16 covering the upper part of the fuel tank 6, and a side cover 17 covering both left and right sides of the fuel tank 6. A control lever 18 for the gearshift lever 13 is inserted vertically through the top cover 16. A through hole 19 can also be formed in the top cover 16 which can be inclined in the longitudinal direction of the vehicle body.

The gearshift lever 13 includes a base body 20 fixedly attached on the vehicle frame, and the control lever 18 is connected to the base body 20 to facilitate shifting of gears.

As shown in FIGS. 2 and 3, the control lever 18 is fitted with a slide cover 21 which covers the upper part of the base body 20 and closes the through hole 19 from below. The slide cover 21 is designed to move in unison or in conjunction with the movement of the control lever 18.

The top cover 16 is purposefully not shown in FIG. 3 in order to provide an unobstructed view of the control lever 18 and its related components.

In a saddle-type vehicle according to the present invention, the gearshift lever 13 can be mounted in the recess 15 provided in the side of the fuel tank 6 and is therefore capable of being positioned more toward the center of the fuel tank 6 than toward the side edge portion of the fuel tank 6.

Therefore, a larger, more comfortable open space is provided between the knees of a vehicle operator sitting astride the seat 7. In addition, the gearshift lever 13 can be mounted closer to the driver than in conventional structural arrangements, thereby achieving improved driver comfort, vehicle operation and performance.

The gearshift lever 13 can be located beneath the tank cover 14 covering the fuel tank 6 in order to provide additional protection.

Although shapes and dimensions of the component members according to the invention have been shown and described as an example in the accompanying figures, it should be understood that various changes and modifications may be made according to preferred design requirements.

According to the embodiments of the present invention as explained above, the gearshift lever 13 is installed in the recess 15 provided in a side of the fuel tank 6. It is, therefore, possible to position the gearshift lever 13 more on the center side of the fuel tank 6 than on the side edge portion of the fuel tank 6. The present invention therefore provides a larger, more comfortable open space between the knees of the driver sitting astride the seat. In addition, the gearshift lever can be positioned relatively closer to the driver than in conventional arrangements, thus improving driver comfort, vehicle operation and performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle with an automatic transmission, said vehicle comprising:
   a fuel tank mounted at a central upper part of a vehicle body;
   a tank cover provided to cover said fuel tank;
   a gearshift lever for said automatic transmission, said gearshift lever extending through said tank cover; and
   a recess formed in a left side or a right side of said fuel tank, wherein said gearshift lever is mounted in a space formed by said recess and said tank cover.

2. The vehicle according to claim 1, wherein said recess is formed or cut toward an inside of said vehicle body on the left side of the fuel tank.

3. The vehicle according to claim 1, wherein said tank cover includes a top cover covering an upper part of the fuel tank, and a side cover covering both left and right sides of the fuel tank.

4. The vehicle according to claim 3, wherein a through hole is formed in the top cover.

5. The vehicle according to claim 3, wherein a control lever for said gearshift lever is oriented in a vertical manner.

6. The vehicle according to claim 4, wherein a control lever for said gearshift lever is oriented in a vertical manner.

7. The vehicle according to claim 6, wherein said through hole is inclined in a direction parallel with a longitudinal direction of the vehicle body.

8. The vehicle according to claim 1, wherein the gearshift lever further includes a base body fixedly attached on a vehicle frame, and a control lever is connected to the base body to facilitate shifting of vehicle gears.

9. The vehicle according to claim 8, wherein the control lever is fitted with a slide cover covering an upper part of the base body and closing a through hole.

10. The vehicle according to claim 6, wherein the control lever is fitted with a slide cover, said slide cover covering an upper part of the base body and closing said through hole.

11. The vehicle according to claim 9, wherein said slide cover moves in conjunction with an operating movement of said control lever.

12. The vehicle according to claim 10, wherein said slide cover moves in conjunction with an operating movement of said control lever.

13. A saddle vehicle comprising:
    a vehicle body having a longitudinal centerline, wherein said vehicle body has a front portion, a central portion, and a rear portion with respect to said longitudinal centerline, and an upper portion located in a portion above said longitudinal centerline and a lower portion located below said longitudinal centerline;
    a fuel tank mounted adjacent to a steering handlebar in said central portion and said upper portion of said vehicle body;
    a tank cover provided to cover said fuel tank;
    a gearshift lever for a transmission, said gearshift lever being inserted through said tank cover; and
    a recess formed in a left side or a right side of said fuel tank, wherein said gearshift lever is mounted in a space formed by said recess and said tank cover.

14. The vehicle according to claim 13, wherein said recess is formed or cut toward an inside of said vehicle body on the left side of the fuel tank.

15. The vehicle according to claim 14, wherein said tank cover includes a top cover covering an upper part of the fuel tank, a side cover covering both left and right sides of the fuel tank, and a through hole formed in the top cover.

16. The vehicle according to claim 15, wherein a control lever for said gearshift lever is inserted through said through hole in said top cover in a vertically oriented manner.

17. The vehicle according to claim 16, wherein said through hole is inclined in a direction parallel with said longitudinal centerline of the vehicle body.

18. The vehicle according to claim 17, wherein the gearshift lever further includes a base body fixedly attached on a vehicle frame, and a control lever is connected to the base body to facilitate shifting of vehicle gears.

19. The vehicle according to claim 18, wherein the control lever is fitted with a slide cover covering an upper part of the base body and closing said through hole.

20. The vehicle according to claim 19, wherein said slide cover moves in conjunction with an operating movement of said control lever.

21. A saddle vehicle with an automatic transmission, said vehicle comprising:
- a fuel tank mounted at a central upper part of a vehicle body;
- a tank cover provided to cover said fuel tank, said tank cover including a top cover covering an upper part of the fuel tank, and a side cover covering both left and right sides of the fuel tank;
- a gearshift lever for said automatic transmission, a control lever for said gearshift lever being inserted through said top cover in a vertically oriented manner; and
- a recess formed in said left side or said right side of said fuel tank in which said gearshift lever is mounted in a space formed by said recess and said tank cover.

\* \* \* \* \*